United States Patent
Ozluturk

(12)
(10) Patent No.: US 6,731,671 B2
(45) Date of Patent: May 4, 2004

(54) RECEPTION METHOD INCLUDING GENERATING COMPLEX FOUR-PHASE SEQUENCES FOR CDMA COMMUNICATION

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 138 days.

(21) Appl. No.: 10/066,968

(22) Filed: Feb. 4, 2002

(65) Prior Publication Data

US 2002/0191680 A1 Dec. 19, 2002

Related U.S. Application Data

(63) Continuation of application No. 10/011,113, filed on Nov. 13, 2001, now Pat. No. 6,606,344, which is a continuation of application No. 09/472,348, filed on Dec. 27, 1999, now Pat. No. 6,337,875, which is a continuation of application No. 08/956,808, filed on Oct. 23, 1997, now Pat. No. 6,026,117.

(51) Int. Cl.[7] .............................................. H04B 1/69
(52) U.S. Cl. ...................................... 375/140; 375/147
(58) Field of Search ............................. 375/130, 140, 375/146, 141, 279, 280, 281, 295, 308, 147, 316, 329, 331; 455/522; 370/342, 320, 445, 335; 327/164, 135

(56) References Cited

U.S. PATENT DOCUMENTS

| | | | |
|---|---|---|---|
| 3,535,452 A | 10/1970 | Oswald | |
| 3,648,238 A | * | 3/1972 | Yarrington .................. 714/762 |
| 4,158,193 A | 6/1979 | D'Antonio | |
| 4,210,879 A | 7/1980 | Poitevin et al. | |
| 4,755,969 A | 7/1988 | Pappas | |
| 5,187,676 A | 2/1993 | Devane | |
| 5,218,559 A | 6/1993 | Angebaud et al. | |
| 5,233,629 A | 8/1993 | Paik et al. | |
| 5,309,474 A | 5/1994 | Gilhousen et al. | |
| 5,361,047 A | 11/1994 | Takahara et al. | |
| 5,369,374 A | 11/1994 | Kojima | |
| 5,373,532 A | 12/1994 | Fujita et al. | |
| 5,408,628 A | 4/1995 | Ameti | |
| 5,467,294 A | 11/1995 | Hu et al. | |
| 5,488,629 A | 1/1996 | Takahashi et al. | |
| 5,497,395 A | 3/1996 | Jou | |
| 5,532,695 A | 7/1996 | Park et al. | |
| 5,640,416 A | 6/1997 | Chalmers | |
| 5,956,328 A | 9/1999 | Sato | |
| 6,201,835 B1 | 3/2001 | Wang | |

OTHER PUBLICATIONS

Mouine et al., "A Novel Way to Generate Pseudo–Random Sequences Longer than Maximal Length Sequences," IEEE, 1998, pp. 529–532.

S. Papadimitriou et al., "Chaotic Real–Time Encryption Using System of Difference Equations with Large Parameter Space," IEEE, 1996, pp. 566–569.

\* cited by examiner

*Primary Examiner*—Tesfaldet Bocure
(74) *Attorney, Agent, or Firm*—Volpe and Koenig, P.C.

(57) ABSTRACT

A reception method including generating complex four-phase pseudo-random sequences comprising: providing a register having a plurality of bits initially set to zero; combining a predetermined value with the plurality of bits within said register to produce a bit combination; replacing the contents of the register with the bit combination; and utilizing bits from at least one predetermined location within said shift register to generate the pseudo-random sequences.

12 Claims, 7 Drawing Sheets

RECEPTION METHOD INCLUDING GENERATING COMPLEX FOUR-PHASE SEQUENCES FOR CDMA COMMUNICATION

CROSS REFERENCE TO RELATED APPLICATION

This application is a continuation of Application No. 10/111,113, filed Nov. 13, 2001, which issued on Aug. 12, 2003 as U.S. Pat. No. 6,606,344; which is a continuation of Application No. 09/472,348, filed Dec. 27, 1999, which issued on Jan. 8, 2002 as U.S. Pat. No. 6,337,875; which is a continuation of Application No. 09/956,808, filed Oct. 23,1997, which issued on Feb. 15, 2000 as U.S. Pat. No. 6,026,117.

BACKGROUND OF THE INVENTION

1. Field of the Invention

The present invention generally relates to an improved sequence design for code-division multiple access (CDMA) communications. More particularly, the invention is directed to generating complex four-phase pseudo-random code sequences which may be directly mapped to a quadrature phase shift keying (QPSK) signal constellation.

2. Description of the Prior Art

Code-division multiple access (CDMA) is a type of spread spectrum communication system wherein each subscriber unit is distinguished from all other subscriber units by the possession of a unique code. In order to communicate with a particular subscriber unit, a transmitting unit imprints the unique code upon a transmission and the receiving unit uses the code to decode the transmission. CDMA communication systems transmit voice and data information using signals that appear noiselike and random. Since the random sequences are generated by standard deterministic logic elements, the generation of the bit sequences are predictable and repeatable. It is the use of these repeatable binary random sequences that permits easy modulation of any information-bearing digital signal for data communications. These predictable random sequences are called pseudo-random sequences.

Each subscriber unit in a CDMA communication system receives a plurality of pseudo-random sequences from base stations which are within the communicating range of the subscriber unit. As indicated above, the receiving unit uses a particular pseudo-random code to attempt to decode one of the received pseudo-random sequences. The particular code can only be used to decode one pseudo-random sequence, the other received pseudo-random sequences contribute to noise.

As the correlation between the pseudo-random sequences used by the CDMA communication system decreases, the amount of noise output by the receiving unit also decreases. This decrease can be explained as follows: There is a high correlation between the one pseudo-random sequence including the data to be transmitted to the subscriber unit and the pseudo-random sequence generated by the receiver. As the correlation between the one pseudo-random sequence and the other pseudo-random sequences decreases (i.e. cross correlation), it becomes easier for the subscriber unit to recognize its particular pseudo-random sequence and filter out all of the other pseudo-random sequences. Thus, noise is reduced and signal clarity enhanced.

There is a need for an improved pseudo-random sequence generator which generates sequences having improved cross correlation properties to reduce the noise experienced by the receiver. There is also a need for a pseudo-random code generator that is easy to implement.

SUMMARY OF THE INVENTION

The present invention provides an improved method and apparatus for generating complex four-phase pseudo-random code sequences, which can easily be mapped to a QPSK signal constellation and which have a low cross correlation and low out-of-phase autocorrelation.

In one embodiment, a pseudo-random code generator produces complex four-phase CDMA codes utilizing an accumulator and a plurality of flip flops. The accumulator receives a quotient of a parameter M divided by a parameter N and receives feedback from the plurality of flip flops. The parameter M and N are integers, wherein M is relatively prime to N. The accumulator combines the quotient with the data received from the flip flops and transmits the combined data to the flip flops. Two bits are extracted and used to produce I and Q codes.

In another embodiment, a pseudo-random code generator produces complex four-phase CDMA codes by providing a circuit for outputting an arithmetic progression of values and an incremental value of the arithmetic progression of values. The pseudo-random code generator also contains a first mixer for receiving the arithmetic progression of values and the incremental values. A second mixer receives the output of the first mixer and combines this output with the quotient of a parameter 2M divided by parameter N, wherein M and N are integers and M is relatively prime to N. Two bits are extracted from the second mixer and are converted into I and Q codes.

Other advantages will become apparent to those skilled in the art after reading the detailed description of the preferred embodiments.

DESCRIPTION OF THE PREFERRED EMBODIMENTS

The preferred embodiments are described with reference to drawing figures wherein like numerals represent like elements throughout.

Figure 1:
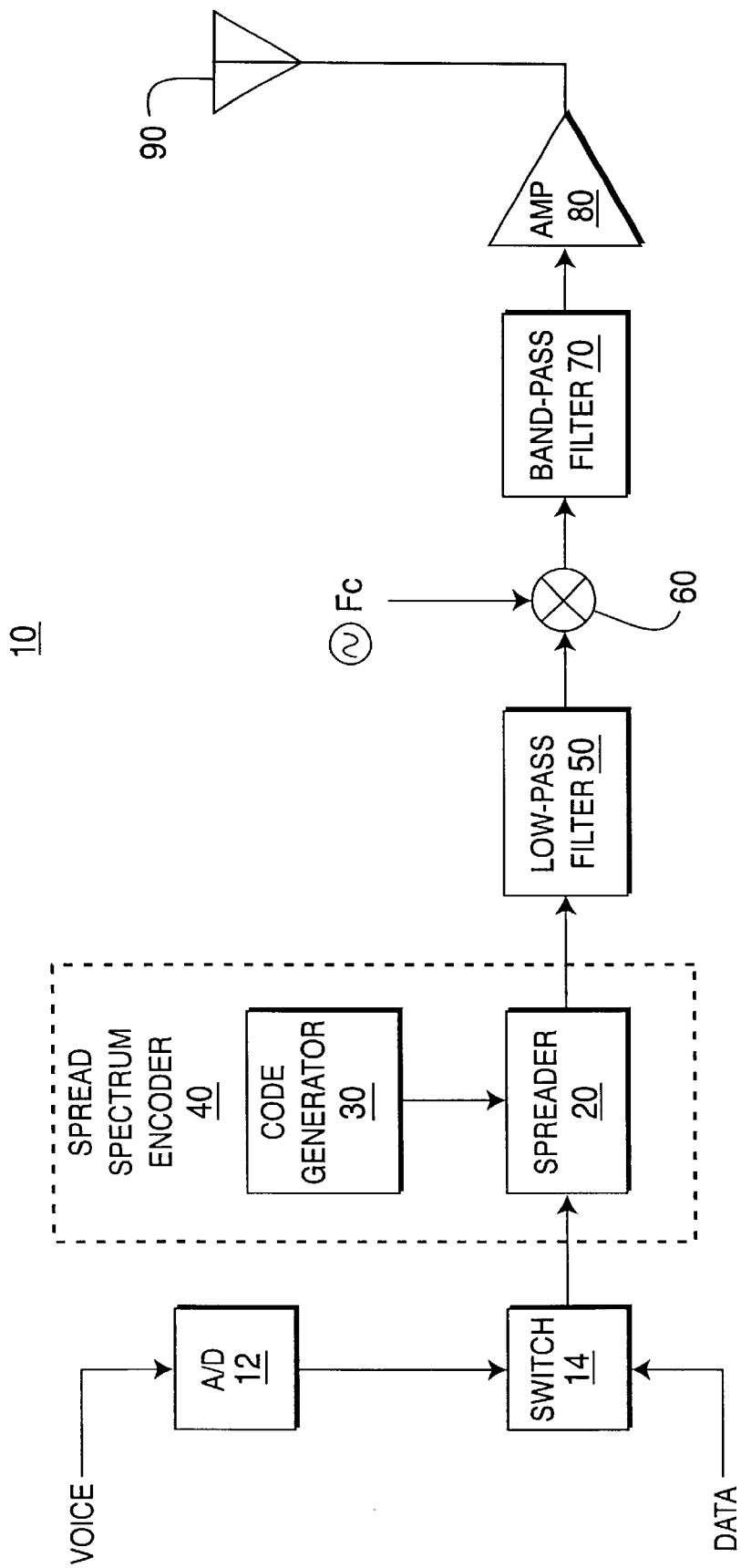
FIG. 1 is a block diagram of a spread spectrum transmitter of the present invention.

A spread spectrum transmitter 10, as shown in FIG. 1, includes an analog-to-digital (A/D) converter 12 for receiving a voice signal. A switch 14 receives both the digital voice signal from the A/D converter 12 and a digital data signal from a terminal (not shown). The switch 14 connects the spread spectrum transmitter 10 with an input for either digital voice signal or digital data. The digital voice signal and digital data are hereafter collectively referred to as digital data. The switch 14 directs the digital data to a spreader 20, which may comprise a mixer. A pseudo-random sequence generated by code generator 30 is applied to the spreader 20. The code generator 30 and the spreader 20 are shown as being contained within spread spectrum encoder 40.

The spreader 20 performs a frequency spectrum spreading function by multiplying the digital data by the pseudo-random sequence in the time domain, which is equivalent to convolving the bimodal spectrum of the digital data with the approximately rectangular spectrum of the pseudo-random sequence in the frequency domain. The output of the spreader 20 is applied to a low-pass filter 50, whose cutoff frequency is equal to the system chip rate, $F_{cr}$. The output of the low-pass filter 50 is then applied to one terminal of a mixer 60 and upconverted, as determined by the carrier frequency $F_c$, which is applied to its other terminal. The upconverted signal is then passed through a band-pass filter 70, which may be a helical resonator. The filter 70 has a bandwidth equal to twice the chip rate and a center frequency equal to the center frequency of the bandwidth of the spread spectrum system. The output of the filter 70 is applied to the input of an RF amplifier 80, whose output drives an antenna 90.

Figure 2:
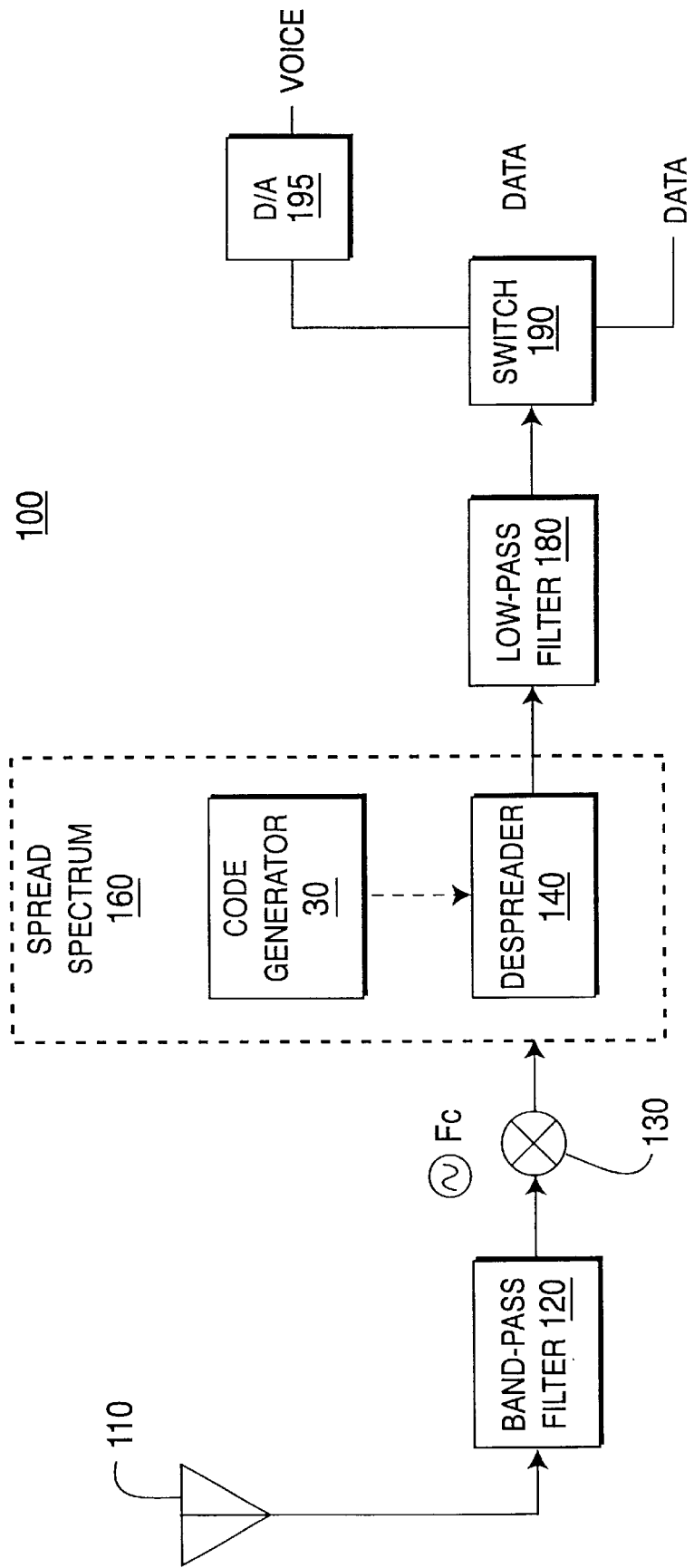
FIG. 2 is a block diagram of a spread spectrum receiver of the present invention.

A spread spectrum receiver 100 is shown in FIG. 2. An antenna 110 receives the transmitted spread spectrum signal, which is filtered by a bandpass filter 120. The filter has a bandwidth equal to twice the chip rate $F_{cr}$, and a center frequency equal to the center frequency of the bandwidth of the spread spectrum system. The output of the filter 120 is subsequently downconverted by a mixer 130, possibly in two stages, to a baseband signal using a local oscillator having a constant frequency which is approximately the same as the carrier frequency $F_c$, of the transmitter 10. The output of the mixer 130 is then despread by applying it to a first terminal of the despreader 140 while applying the same pseudo-random sequence as delivered to the spreader 20 to a second terminal of the despreader 140. The pseudo-random sequence is generated by a code generator 30. The despreader 140 and the code generator 30 are contained within a spread spectrum decoder 160 as shown in FIG. 2. The output of the despreader 140 is applied to a low pass filter 180, which has a cutoff frequency at the data rate of the data input to the spread spectrum transmitter 10. The output of the low-pass filter 180 is a replica of the data input to FIG. 1.

It should be appreciated by those of skill in the art that the pseudo-random sequence used in the receiver 100 of a spread spectrum communication system must be synchronized with the pseudo-random sequence used in the transmitter 10. Methods for achieving this synchronization are also well known.

Figure 3:
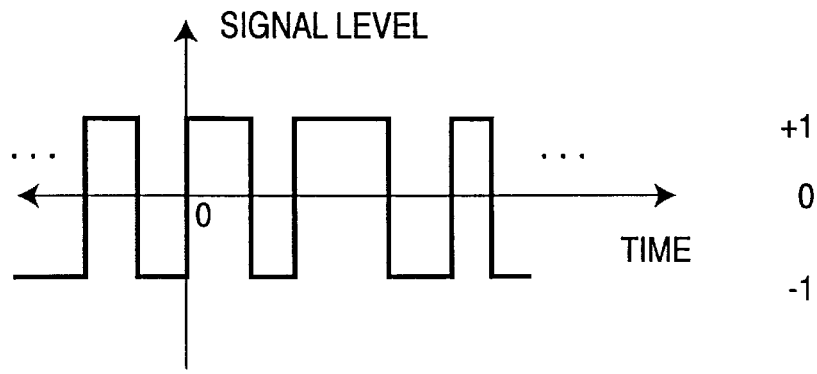
FIG. 3 is a timing diagram of a conventional pseudo-random code sequence.

A conventional spreading sequence is a pseudo-random digital sequence as shown in FIG. 3. The sequence is used to spread the signal being transmitted and to despread the signal being received. Two different binary codes using two different LFSR circuits provide I and Q channels for transmission of data. However, if there is high cross-correlation between the I and Q channels at the receiver side, a great deal of noise will be output by the receiver.

The code generator 30 of the present invention generates pseudo-random code sequences with greatly enhanced cross-correlation properties compared with the prior art pseudo-random sequences such as the one shown in FIG. 3. A prior art pseudo-random sequence essentially comprises a signal having different frequency components. This signal is a combination of sinusoidal waveforms having different frequencies; both high frequency sinusoidal waveforms and low frequency sinusoidal waveforms. Thus, the signal has a frequency spectrum which can be divided into frequency regions. Those sinusoids having stronger frequencies (higher amplitudes) will be more dominant in the signal than those sinusoids having weaker frequencies (lower amplitudes). However, in order to generate an enhanced pseudo-random code (highly random code) as in the present invention, the strength or amplitude in each frequency region should be the same. Highly random codes have the property that they contain components in all frequency regions, resulting in a flat spectrum. The code generator 30 generates a pseudo-random sequence wherein the amplitude of the sinusoids in all frequency regions is approximately the same (flat) as will be explained in detail below.

A pseudo-random sequence having a length N and frequency regions X can be represented by Y frequency bins of a discrete Fourier series representation, wherein each bin corresponds to a frequency region. There are Y bins for the X frequency regions $(2\pi/T)k$, k=0, ..., N-1 where T is the period of the spreading sequence in time and X=Y=N. The instantaneous frequency of the sequence should ideally spend equal time in each of the X frequency regions. Therefore, each frequency region or bin will have the same strength. For example, let s(t) denote the spreading sequence which is periodic. Then $$s(t) = \sum_k c_k e^{j2\pi kt/T} \qquad \text{Equation (1)}$$

is the Fourier Series representation where $$c_k = \frac{1}{T}\int_T s(t)e^{-j2\pi kt/T} dt \qquad \text{Equation (2)}$$

where $C_k$ is the strength of the sinusoids at one of the discrete Fourier series representations or the strength of the sinusoids in the region or bin. The average power in s(t) is written as follows:

$$P = \sum_k |c_k|^2 \qquad \text{Equation (3)}$$

The magnitude spectrum of s(t) is $|C_k|$ and power spectrum is $|C_k|^2$. The ideal power spectrum is flat, where the average power is distributed over all frequency bins equally. This results in a narrow autocorrelation. All of the $|C_k|^2$ should be equal. To obtain this, the instantaneous frequency is:

$$\frac{2\pi}{T}Mk, k = 0, \ldots, N-1 \qquad \text{Equation (4)}$$

where M and N are integers and M is relatively prime to N (M and N do not have the same common factor). This guarantees that each frequency bin $(2\pi/T)k$ is visited equally. For example, if N=7 and M=3, the instantaneous frequency is then $$0, \frac{2\pi}{T}\times 3, \frac{2\pi}{T}\times 6, \ldots, \frac{2\pi}{T}\times 18 \qquad \text{Equation (5)}$$

Since a discontinuity in the phase has the effect of spreading the power into other frequency bins, the phase is preferably continuous and free of sudden bumps as much as possible.

The primary constraint is that the phase of the complex spreading sequence should be limited to $\{0\pi/2, \pi, 3\pi/2\}$. This limitation leads to sudden phase changes and prevents the power spectrum from becoming completely flat. However, a sequence with relatively flat power spectral density can be obtained. For the phase to be continuous at $t=(k/N)T$, the recursive equation is $$\Theta_{k-1} - \Theta_k = \frac{2\pi}{N}Mk \qquad \text{Equation (6)}$$

where $\Theta$ is the phase of individual chips in a sequence and k is the index (order) of the chips in the sequence. If $\Theta_0$ is arbitrarily chosen as one of $(0, \pi/2, \pi, 3\pi 2)$, then $\Theta_1, \Theta_2, \ldots, \Theta_n$ can be generated sequentially. This solution results in flat spectra, which is the optimum solution. The choice of $\Theta_0$ $(0, \pi/2, \pi, 3\pi/2)$ makes no difference because a constant phase offset over the sequence does not change its spectral properties.

The suboptimum implementation of the above equation when $\Theta_k$ is limited to $\{0, \pi/2, \pi, 3\pi/2\}$ is as follows:

$$\Theta_{k-1} - \Theta_k = \frac{\pi}{2}\left(\left\lfloor 4\frac{M}{N}k\right\rfloor \bmod 4\right) \qquad \text{Equation (7)}$$

where $\lfloor 4(M/N)k \rfloor$ means the largest integer less than or equal to $4(M/N)k$. This equation is a modified version of Equation (6) and it performs the mapping of phase angles to one of four points for easy QPSK implementation. It limits the phases to the set $\{0, \pi/2, \pi, 3\pi/2\}$.

Continuing the sequential phase deviation to develop a second suboptimum implementation, one has:

$$\Theta_k = \Theta_{k-1} - \frac{2\pi}{T}M\frac{k}{N}T \qquad \text{Equation (8)}$$

$$\Theta_k = \Theta_{k-2} - \frac{2\pi}{T}M\frac{k-1}{N}T - \frac{2\pi}{T}M\frac{k}{N}T$$

$$\vdots$$

$$\Theta_k = \Theta_0 - \frac{2\pi}{T}M\frac{T}{N}\sum_{i=1}^{k}i = \Theta_0 - \frac{2\pi}{T}M\frac{T}{N}\frac{k(k+1)}{2}$$

$$\Theta_k = \Theta_0 - \pi\frac{M}{N}k(k+1) \qquad \text{Equation (9)}$$

Again, the second suboptimum implementation with four phases $(0, \pi/2, \pi, 3\pi/2)$ is obtained as:

$$\Theta_k = \Theta_0 - \frac{\pi}{2}\left(\left\lfloor 2\frac{M}{N}k(k+1)\right\rfloor \bmod 4\right) \qquad \text{Equation (10)}$$

If $\Theta_0 = 0$, then:

$$\Theta_k = \frac{\pi}{2}\left\lfloor 2\frac{M}{N}k(k+1)\right\rfloor \bmod 4 \qquad \text{Equation (11)}$$

for this second suboptimum implementation.

Examining Equation 6 one sees that each phase term can be obtained by adding a variable term $(2\pi/N)(Mk)$ to the previous phase. Furthermore, since $2\pi k$ is equal to zero modulo $2\pi$, the term one needs to add each phase to find the next phase reduces to (M/N), which is not an integer. Therefore, a possible implementation can be a recursive adder (accumulator) which adds the term (M/N) to the phase in each iteration.

Figure 4:
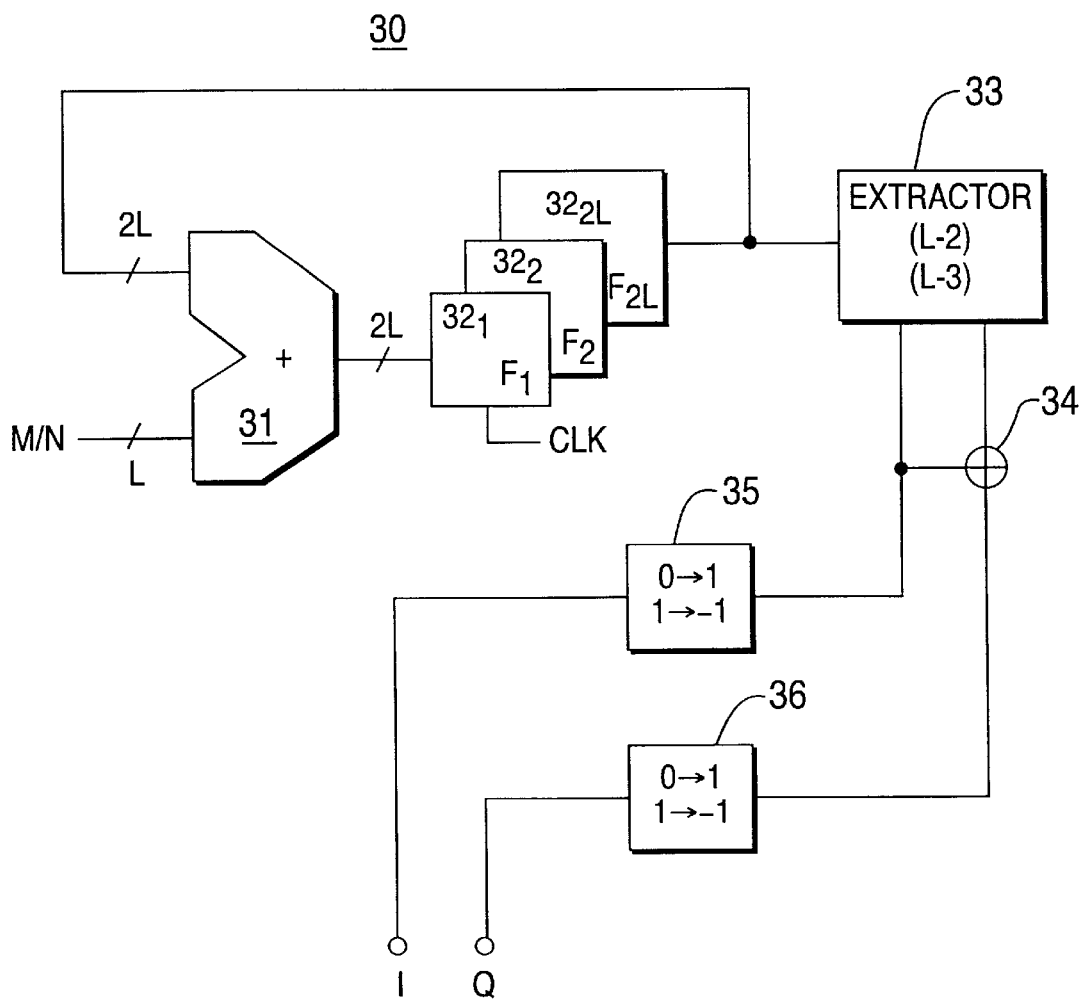
FIG. 4 is a first embodiment of a spread spectrum code generator for generating four-phase sequences according to the present invention.

FIG. 4 shows a first embodiment of the code generator 30 for generating four-phase pseudo-random code sequences which greatly improve autocorrelation properties and cross correlation properties. The first embodiment is an example of the first suboptimum implementation of Equation 7. Although four-phase sequences of any length can be generated, a length of 127 bits is selected as an example. Further, for the purposes of this example, there are N number of chips in a symbol, which represents the processing gain. A number M is selected to be relatively prime to N, which means that M and N do not have a common factor. The number of bits L required to provide a binary representation of the processing gain N is determined by solving the following equation:

$$N \leq 2^L. \qquad \text{Equation (12)}$$

Figure 5:
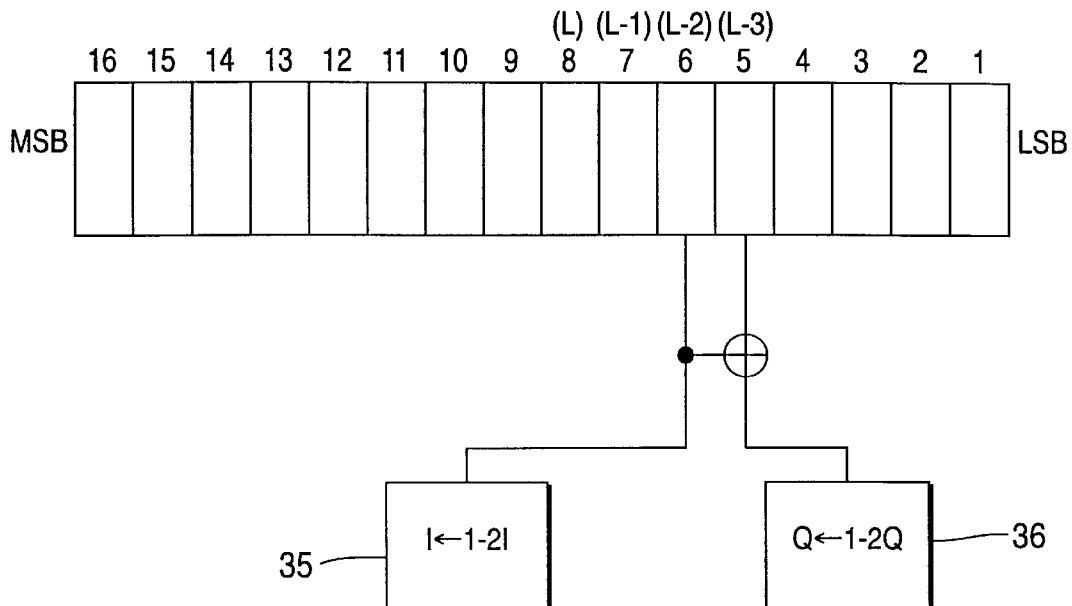
FIG. 5 is a diagram showing the conversion to I and Q in the first embodiment of the spread spectrum code generator.

The code generator 30 includes an accumulator 31 which is 2L bits in length. Since N=127 in this example, L=8. Therefore, accumulator 31 has a length of 16 bits. An eight bit number M/N is applied to one input of the accumulator 31. A sixteen bit number from flip flops $32_1$ through $32_{2L}$ is applied to a second input for the accumulator 31. Flip flops $32_1$ through $32_{2L}$ may be replaced by a shift register. Although bits are input to flip flops $32_1$–$32_{2L}$ and to accumulator 31 in parallel, the bits could also be input in series. The sum of the two numbers input into the accumulator 31 is transmitted to flip flops $32_1$ through $32_{2L}$. An extractor 33 extracts the fifth and sixth least significant bits from the flip flops $32_1$ through $32_{2L}$ (FIG. 5). The fifth and sixth least significant bits are applied to an exclusive—or gate 34.

The output of the exclusive—or gate 34 is converted to a Q value by a converter 36. The sixth bit output from extractor 33 is converted to an I value by converter 35. The I and Q values output from converters 35 and 36 are applied to spreader 20 or despreader 140. As indicated before, M/N is an eight bit number in this example. The fifth and sixth bits of the accumulator output represent the first two significant bits of 4 (M/N) which appears in Equation (7). When 4 (M/N) is mapped to one of four values $\{0, 1, 2, 3\}$ by taking modulo 4, the result is the first two significant bits of 4(M/N), or equivalently fifth and sixth bits of the accumulator.

Figure 6:
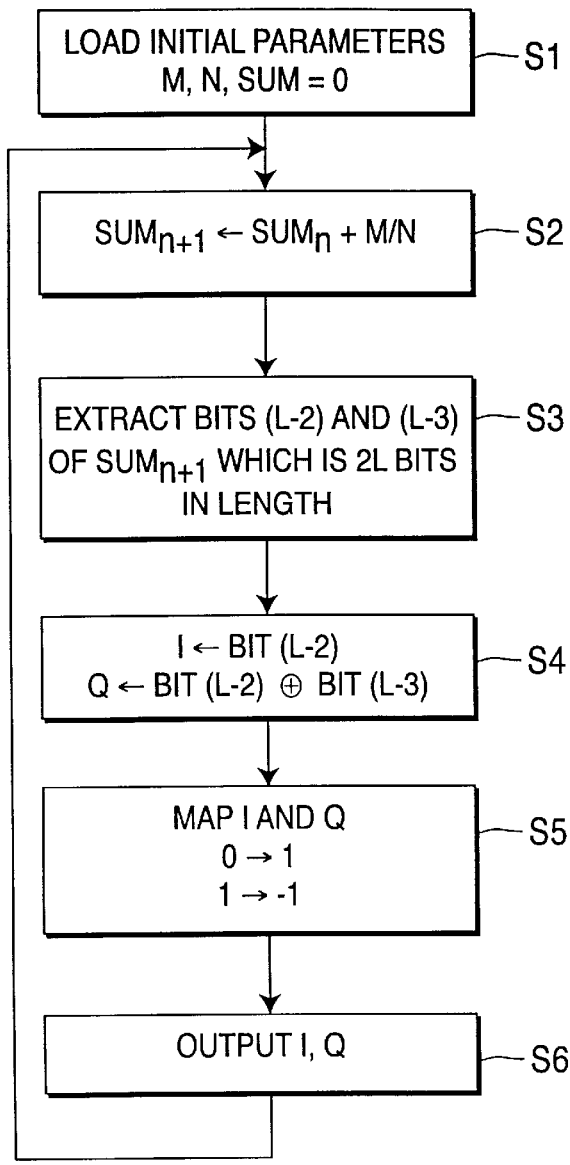
FIG. 6 is a diagram showing the method steps for generating four-phase sequences according to the first embodiment of the present invention.

FIG. 6 is a flow diagram of the method performed by the circuit shown in FIG. 4 The initial parameters M and N are loaded into registers or memory (not shown) before performing the dividing function (M divided by N). In addition, the value in accumulator 31 is preferably equal to zero. The remaining apparatus in the code generator 30 is also initialized (S1). The sum, which initially is zero, is added to the quotient of M/N (S2). The fifth and sixth bits of the new sum are extracted (S3) in order to be converted into the I and Q values (S4 and S5). The bits (L-2) and (L-3) should be mapped to QPSK constellation as follows:

00→11
01→1-1
10→-1-1
11→-11

This mapping can be done in software or hardware by using first:

| (L-2) | (L-3) |   | (L-2) | (L-2)⊕(L-3) |
|-------|-------|---|-------|-------------|
| 0     | 0     | → | 0     | 0           |
| 0     | 1     | → | 0     | 1           |
| 1     | 0     | → | 1     | 1           |
| 1     | 1     | → | 1     | 0           | and then using the standard 0→1, 1→-1 mapping.

For example, if the sixth bit for L-2 bit is equal to zero, then the I value is one. If the sixth bit a one, then the I value is negative one. In the case of the Q value, if the output of exclusive—or gate 34 is a zero, the Q value is one. If the output of exclusive—or gate 34 is a one is negative one. The I and Q values are output to the spreader 20 or despreader 140 (S6). Method steps S2 through S6 are repeated until all the digital data supplied by switch 14 is transmitted or all the data is received by switch 190.

Figure 7:
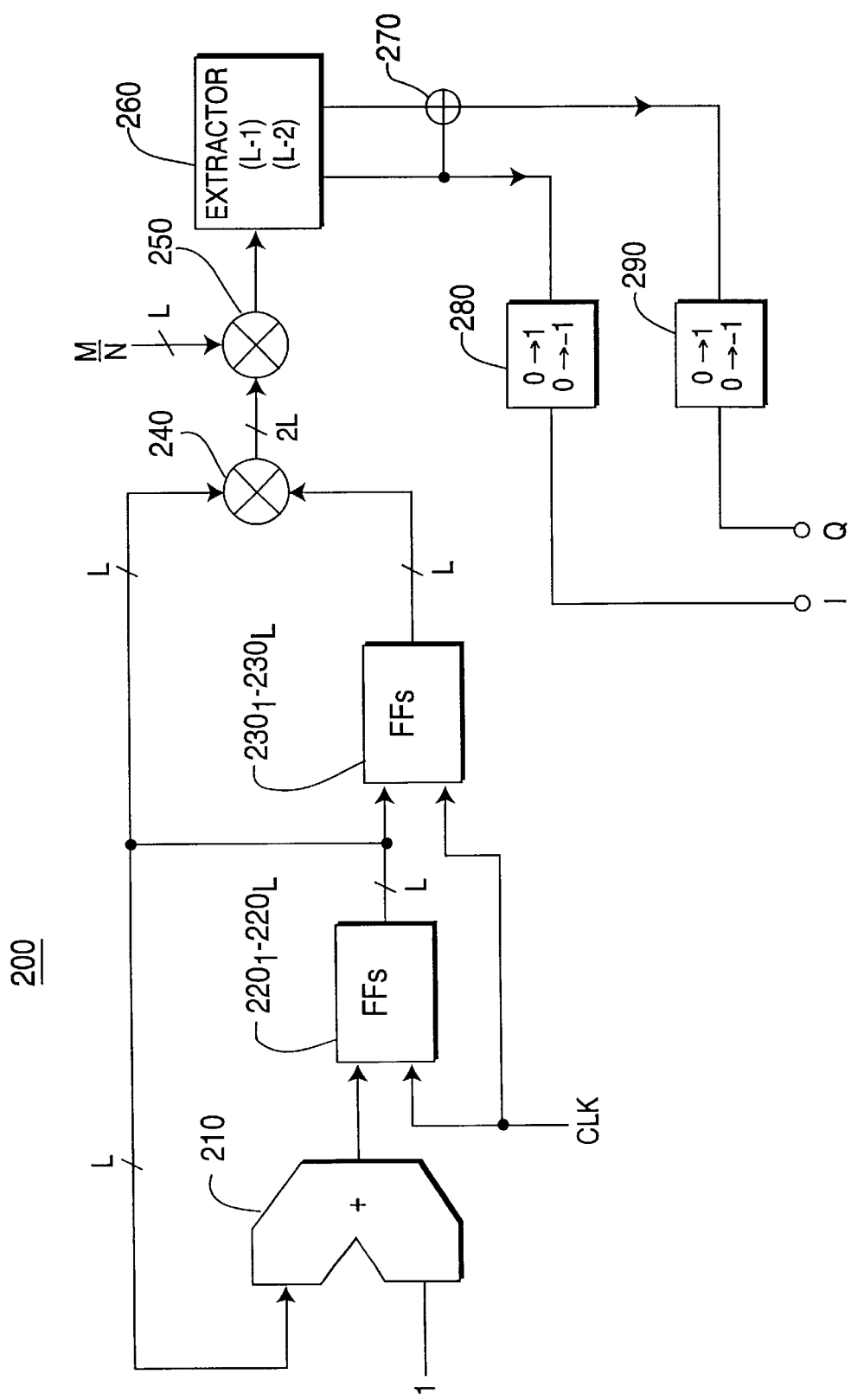
FIG. 7 is a second embodiment of a spread spectrum code generator for generating four-phase sequences according to the present invention.

FIG. 7 shows a second embodiment of the code generator 200. Code generator 200 is substituted for code generator 30 and generates four-phase pseudo-random code sequences similar to those generated by the code generator 200 which greatly improve auto correlation properties and cross correlation properties. The second embodiment is an example of the second suboptimum implementation of Equation (11). Although four-phase sequences of any length can be generated, a length of 127 bits is selected as an example. Further, for the purposes of this example, there are N number of chips in a symbol, which represents the processing gain. A number M is selected to be relatively prime to N. The number of bits L required to provide a binary representation of processing gain N is determined by solving Equation (12). Since M=127 in this example, L=8. Therefore (M/N) is sixteen bits in length.

Figure 8:
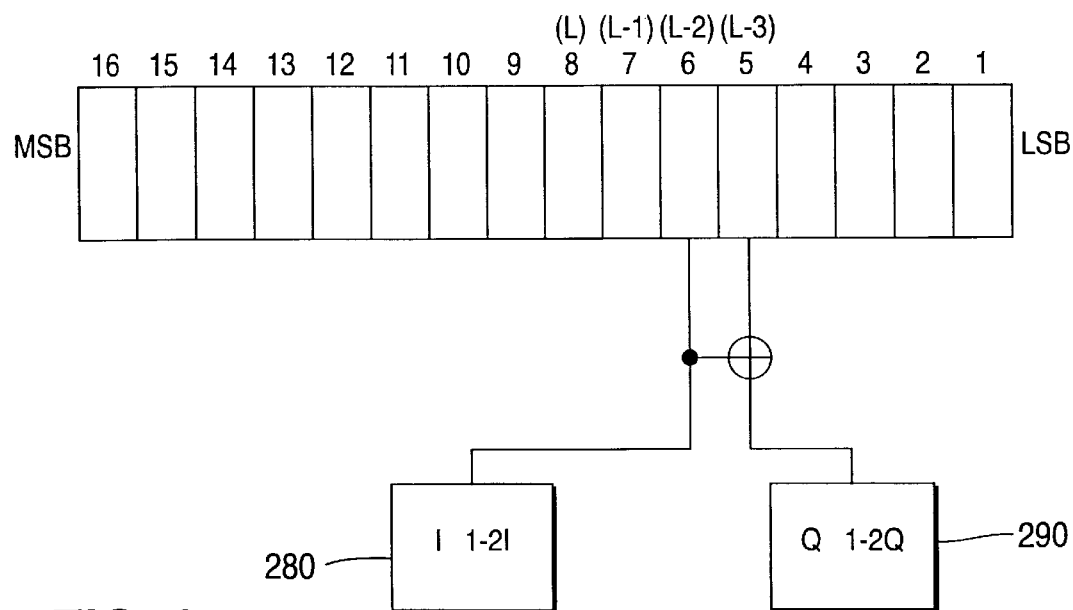
FIG. 8 is a diagram showing the conversion to I and Q in the second embodiment of the spread spectrum code generator.

The code generator 30 includes an accumulator 210 which is L bits in length. Accumulator 210 has a length of 8 bits. A "1" is preferably applied to one input of accumulator 210. The number from flip flops $220_1$ through $220_L$ is applied to a second input of the accumulator 210. Flip flops $220_1$ through $220_L$ may be replaced by a shift register. Although bits are input to flip flops $220_1$ through $220_L$ and accumulator 210 in parallel, the bits could be input in series. The sum of the two numbers input into the accumulator 210 is transmitted to flip flops $220_1$ through $220_L$. The output of flip flops $220_1$ through $220_L$ are transmitted to flip flops $230_1$ through $230_L$ as well as mixer 240. The mixer 240 also receives the output of flip flops $230_1$ through $230_L$. The accumulator 210 and flip flops $220_1$-$220_L$, flip flops $230_1$-$230_L$, and mixer 240 provide a flip flop feedback circuit. The output of mixer 240 is input to mixer 250. Mixer 250 also receives an 8 bit input from (M/N). The extractor 260 extracts the fifth and sixth least significant bits from the mixer 250. The sixth least significant bit output from extractor 260 is converted to an I value by converter 280. The fifth and sixth least significant bits are applied to an exclusive—or gate 270. The output of the exclusive—or gate 270 is converted to a Q value by a converter 290 as shown in FIG. 8. The I and Q values output from converters 280 and 290 are applied to spreader 20 or despreader 140. As indicated before, (M/N) is an eight bit number in this example. Flip flops $220_1$ through $220_1$ output the k value and flip flops $230_1$ through $230_L$ output the k+1 value to the mixer 240. The mixer 250 receives the output of mixer 240 and the product of (M/N). When 2(M/N)k(k+1) is mapped to one of the four values {0, 1, 2, 3} by taking modulo 4, the result is the fifth and sixth bits from extractor 260 (FIG. 8).

Figure 9:
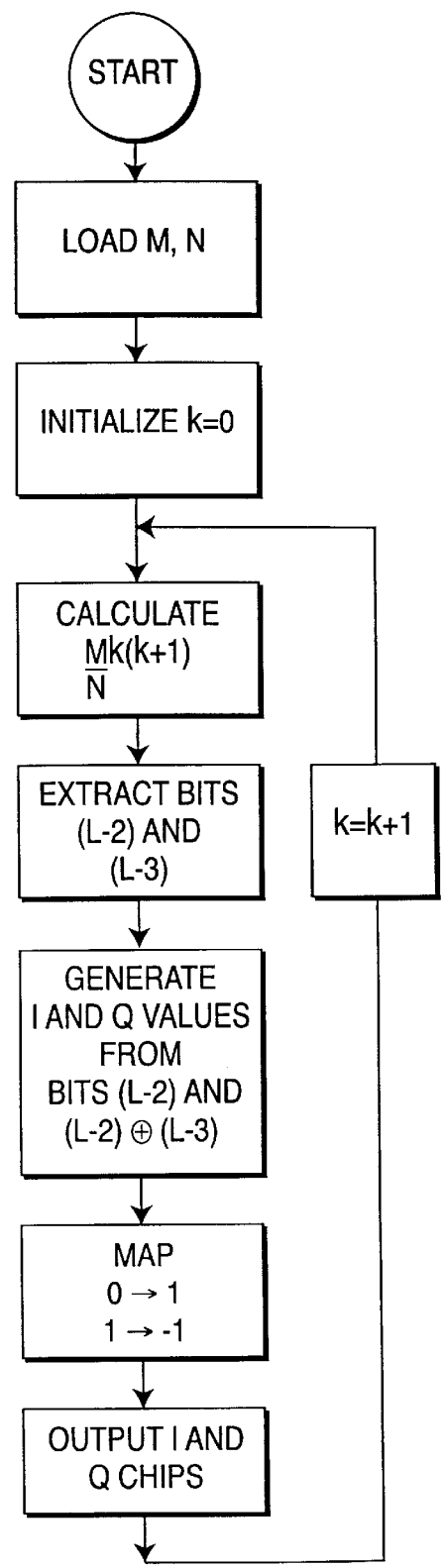
FIG. 9 is a diagram showing the method steps for generating four-phase sequences according to the second embodiment of the present invention.

FIG. 9 is a flow diagram of the method performed by the circuit shown in FIG. 7. The initial parameters M and N are loaded into registers or memory (not shown) before performing the dividing function (M/N). In addition, the value k is preferably equal to zero. The remaining apparatus in the second embodiment of the code generator 200 is also initialized (S1). The value of (M/N)k(k+1) is calculated (S2). The fifth and sixth bits resulting from the above calculation are extracted (S3) in order to be converted into I and Q values (S4 and S5). The bits (L-2) and (L-3) should be mapped to QPSK constellation as follows:

00→11
01→1-1
10→-1-1
11→-11

This mapping can be done in software or hardware by using first:

| (L-2) | (L-3) |   | (L-2) | (L-2)⊕(L-3) |
|-------|-------|---|-------|-------------|
| 0     | 0     | → | 0     | 0           |
| 0     | 1     | → | 0     | 1           |
| 1     | 0     | → | 1     | 1           |
| 1     | 1     | → | 1     | 0           | and then using the standard 0→1, 1→-1 mapping.

For example, if the sixth bit for L-2 is equal to zero, then the I value is 1. If the sixth bit is a 1 then I value is -1. In the case of the Q value, if the output of the exclusive—or gate 270 is a zero the Q value is 1. If the output of the exclusive—or gate 270 is a 1, the Q value is -1. The I and Q values are output to the spreader 20 or the despreader 140 (S6). The K value is incremented. Method steps S2 through S7 are repeated into all the digital data supplied by switch 14 is transmitted where all the data is received by switch 190.

Figure 10:
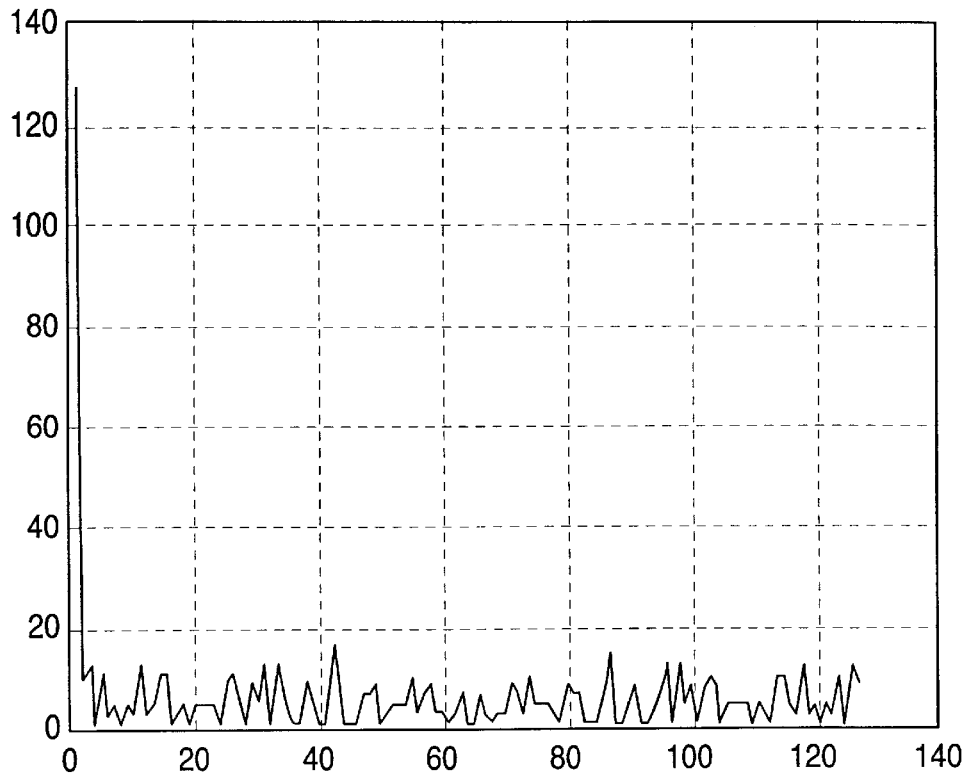
FIG. 10 is a graph of an example of an autocorrelation function for the first suboptimum implementation.

FIG. 10 shows an auto correlation function where N=127 and M=44, which is the result of using the first suboptimum implementation to generate the pseudo-random code.

Figure 11:
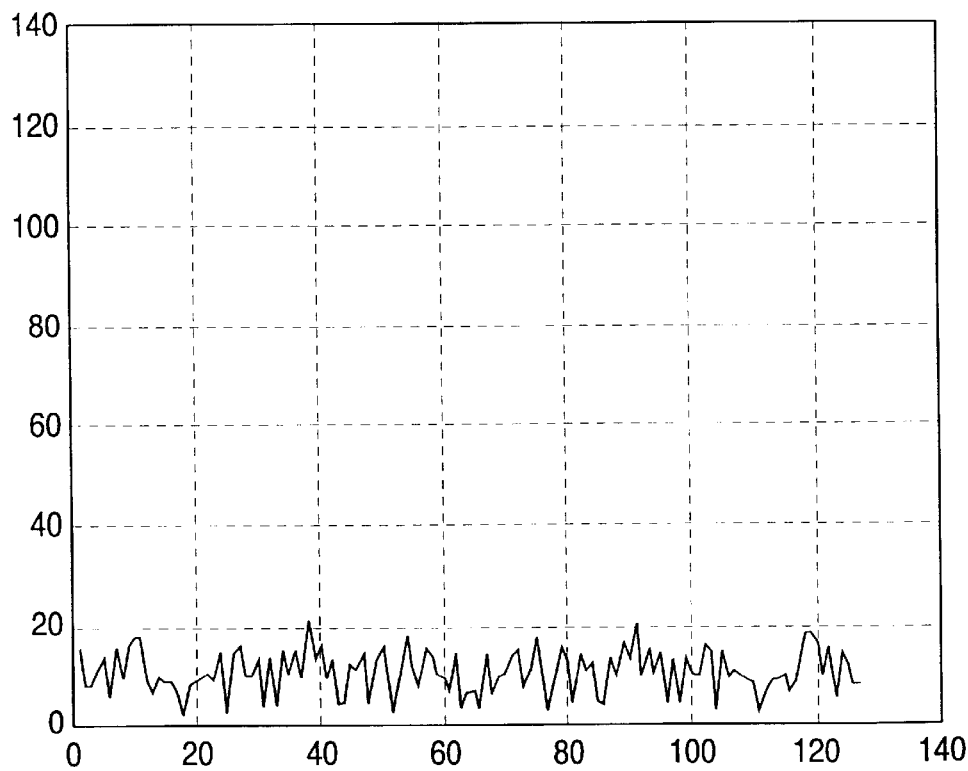
FIG. 11 is an example of a crosscorrelation function for the first suboptimum implementation.

FIG. 11 shows a cross correlation function where N=127 and M=44, which is the result of using the first suboptimum implementation to generate the pseudo-random code.

The autocorrelation a(n) for the sequence s(k) is given as:

$$a(n) = \sum_{k=1}^{N} s(k)s*(k+n) \qquad \text{Equation (13)}$$

where the indexes in parentheses are taken modulo N, and the crosscorrelation c(n) of two sequences s(k) and r(k) is given as:

$$c(n) = \sum_{k=1}^{N} s(k) r*(k+n) \quad \text{Equation (14)}$$

where again the index is taken modulo N. The first suboptimum implementation achieves the desirable result of making the magnitude of the crosscorrelation and autocorrelation (except for a(0)) small compared to N. Although the results of the example of the second suboptimum implementation are not shown, the results are similar. Equations 13 and 14 are well known to one having ordinary skill in the art.

Although the invention has been described in part by making detailed reference to certain specific embodiments, such detail is intended to be instructive rather than restrictive. It will be appreciated by those skilled in the art that many variations may be made in a structure and mode of operation without departing from the spirit and scope of the invention as disclosed in the teachings herein.

What is claimed is:

1. A reception method including generating a complex four-phase pseudo-random sequence having I and Q portions comprising:
    (a) providing a register having a plurality of bits initially set to zero;
    (b) having a predetermined value comprising a plurality of bits;
    (c) combining said predetermined value with said plurality of bits within said register to produce a bit combination;
    (d) replacing the contents of the register with the bit combination;
    (e) utilizing a first bit from a first predetermined location within said shift register to generate said I portion;
    (f) utilizing a second bit from a second predetermined location within said shift register to generate said Q portion; and
    (g) repeating steps (c), (d), (e) and (f).

2. The reception method of claim 1, whereby said predetermined value is a quotient of a parameter M divided by a parameter N, wherein M and N are integers and M is relatively prime to N.

3. The reception method of claim 2, whereby said combining step is performed by adding the quotient of M/N and the contents of the register.

4. A method for despreading voice or data signals for reception of a code division multiple access (CDMA) communication including generating four-phase pseudo-random sequences, the method comprising:
    (a) selecting a parameter M and a processing gain N wherein M and N are integers and M is relatively prime to N;
    (b) dividing the parameter M by the processing gain N to provide a quotient;
    (c) mixing the quotient with an arithmetic progression of values and an incremental value of said arithmetic progression of values to provide a result;
    (d) extracting first and second bits from the result;
    (e) generating I and Q data from the extracted first and second bits respectively;
    (f) using the I and Q data to despread said voice or data signals; and
    (g) repeating steps (c) through (f).

5. A reception method for generating complex four-phase code division multiple access (CDMA) codes utilized for despreading a spread voice or data signals comprising:
    (a) providing a register having a plurality of bits;
    (b) selecting a first parameter M and a second parameter N, wherein M and N are integers and M is relatively prime to N;
    (c) creating a quotient M/N;
    (d) combining the quotient M/N with the contents of the register to produce a bit combination;
    (e) replacing the contents of the register with the bit combination;
    (f) extracting first and second bits from the register;
    (g) generating I and Q codes from the first and second extracted bits;
    (h) outputting the I and Q codes for reception; and
    (i) repeating steps (d) through (h).

6. The method of claim 5 wherein the register has sixteen bits of progressively more significance.

7. The method of claim 5, wherein said combining is performed by adding the quotient of M/N and the content of the register.

8. The method of claim 5, further comprising outputting said I and Q codes to a despreader to despread said spread voice or data signals.

9. A reception method for generating four-phase code division multiple access (CDMA) codes used for despreading spread voice or data signals, the reception method comprising:
    (a) receiving spread voice or data signals;
    (b) selecting a parameter M and a processing gain N wherein M and N are integers and M is relatively prime to N;
    (c) dividing M by N to provide a quotient;
    (d) mixing the quotient with a series of values and an incremental value of said series of values to provide a result;
    (e) extracting first and second bits from the result;
    (f) generating I and Q data from the extracted first and second bits, respectively;
    (g) outputting the I and Q data to a spreader; and
    (h) despreading said voice or data signals.

10. The reception method of claim 9, wherein said series of values comprises an arithmetic progression.

11. A wireless reception method for generating four-phase pseudo-random sequences, and utilizing the sequences for despreading spread voice or data signals comprising:
    (a) receiving spread voice or data signals;
    (b) selecting a parameter M and a processing gain N, wherein M and N are integers and M is relatively prime to N;
    (c) dividing the parameter M by the processing gain N to provide a quotient;
    (d) mixing the quotient with an arithmetic progression of values and an incremental value of said arithmetic progression of values to provide a result;
    (e) extracting first and second bits from the result;
    (f) generating I and Q data from the extracted first and second bits;
    (g) outputting the I and Q data to a despreader;
    (h) despreading said voice or data signals with said I and Q data; and
    (i) repeating steps (d) through (h).

12. The reception method of claim 11, wherein the first bit is the fifth least significant bit in said result, and wherein the second bit is the sixth least significant bit in said result.

* * * * *

UNITED STATES PATENT AND TRADEMARK OFFICE
CERTIFICATE OF CORRECTION

PATENT NO. : 6,731,671 B2
DATED : May 4, 2004
INVENTOR(S) : Faith M. Ozluturk

It is certified that error appears in the above-identified patent and that said Letters Patent is hereby corrected as shown below:

Column 4,
Line 54, after the word "where", delete "$C_k$" and insert therefor -- $c_k$ --.
Line 63, after the word "is", delete "$|C_k|$" and insert -- therefor -- $|c_k|$ --.
Line 64, after the first instance of the word "is", delete "$|C_k|^2$" and insert therefor -- $|c_k|^2$ --.
Line 66, after the word "the", delete "$|C_k|^2$" and insert therefor -- $|c_k|^2$ --.

Column 5,
Line 20, after the word "to", delete "$\{0\pi/2, \pi, 3\pi/2\}$" and insert therefor -- $\{0, \pi/2, ,\pi, 3\pi/2\}$ --.
Line 33, after the word "of", delete "$\{0, \pi/2, \pi, 3\pi 2\}$" and insert therefor -- $\{0, \pi/2, \pi, 3\pi/2\}$ --.

Column 7,
Line 25, after the first instance of the word "one", insert -- , the Q value --.

Column 8,
Line 6, after the word "through", delete "$220_1$" and insert therefor -- $220_L$ --.
Line 44, after the second instance of the number "1", delete ,"then" and insert therefor -- , then the --.
Line 49, after the word "The", delete "K" and insert therefor -- k --.

Signed and Sealed this

Seventeenth Day of August, 2004

JON W. DUDAS
*Acting Director of the United States Patent and Trademark Office*